UNITED STATES PATENT OFFICE.

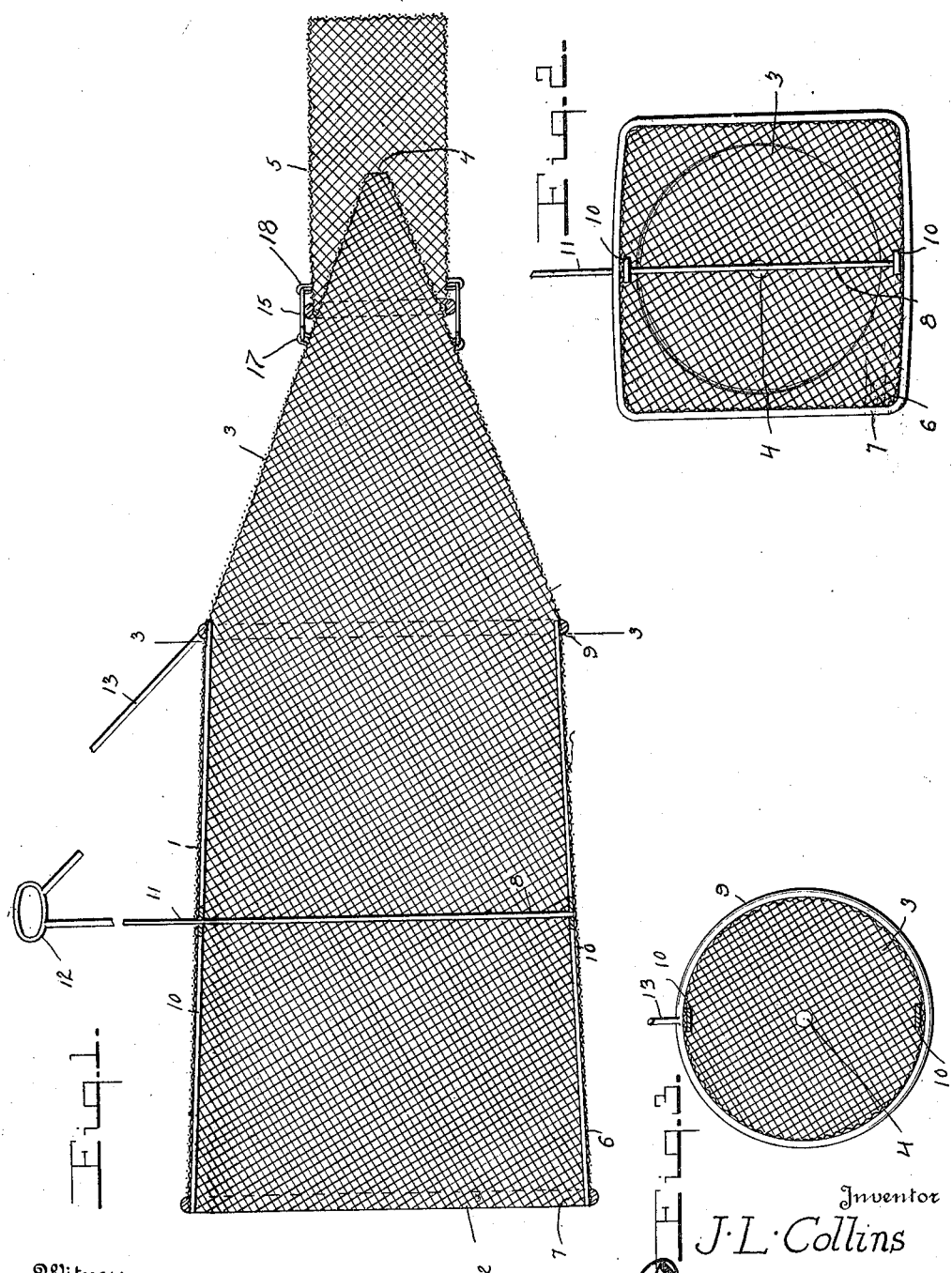

JESS L. COLLINS, OF DEATSVILLE, ALABAMA.

COMBINED MINNOW SEINE AND TRAP.

1,317,555.   Specification of Letters Patent.   Patented Sept. 30, 1919.

Application filed November 24, 1916. Serial No. 133,226.

*To all whom it may concern:*

Be it known that I, JESS L. COLLINS, a citizen of the United States, residing at Deatsville, in the county of Elmore and State of Alabama, have invented certain new and useful Improvements in Combined Minnow Seines and Traps; and I do hereby declare the following to be a full, clear, and exact description of the invention, such as will enable others skilled in the art to which it appertains to make and use the same.

The invention relates to a combined minnow seine and trap.

An important object of this invention is to provide a minnow seine and trap having novel supporting means whereby the trap may be expeditiously thrust through the water for trapping purposes.

A further object is to provide a minnow seine and trap which is strong, simple and durable in use.

With these and other objects in view, the invention consists in the construction and novel combination of parts hereinafter fully described, illustrated in the accompanying drawing, and pointed out in the claim hereto appended; it being understood that various changes in the form, proportion, size and minor details of construction, within the scope of the claim, may be resorted to without departing from the spirit or sacrificing any of the advantages of the invention.

In the drawing:

Figure 1 is a longitudinal sectional view of a minnow seine and trap constructed in accordance with this invention, Fig. 2 is an end elevation of the same, Fig. 3 is a transverse sectional view on the line 3—3 of Fig. 1.

Like numerals of reference designate corresponding parts in all the figures of the drawing.

In the accompanying drawing in which is illustrated the preferred embodiment of the invention the combined minnow seine and trap comprises in its construction a tubular body 1 open at the front end 2 and provided at the rear with a tapered portion 3 of conical form and having an opening 4 at the apex and adapted to extend within a substantially cylindrical combined trap section and basket 5, as clearly illustrated in Fig. 1 of the drawing. The tubular body is constructed of woven wire, or other suitable material, supported by a suitable frame 6, preferably constructed of rods of half round metal, as shown, but any other suitable material may, of course, be employed in the construction of the frame. The frame is provided with spaced bands 7, and 9, and suitable longitudinal connecting bars 10, but the framework may be varied to suit the size of the device. The band 7 at the front end of the tubular body is substantially rectangular and the body has a slight taper toward the band 9, which is circular, and from which the conical tapered portion 3 extends. A rod 8 passes through the central portion of the body 1 and extends vertically from the same for forming a handle 11. A hand loop 12 is secured to the handle 11 and extends vertically and longitudinally of the body. An inclined brace 13 extends from the handle 12 and is secured to the rear band 9.

The combined trap section and basket is open at one end and closed at the other end, and the said section 5 is secured on the end of the tapered section 3 by means of hooks 15, preferably secured to the tapered or conical portion of the trap or seine body and engaging the trap section or basket at diametrically opposite points, as clearly shown in Fig. 1 of the drawings. This will enable the trap section to be readily detached from the body of the device. The hooks 15 are engaged by apertured ears 17 and 18 of the adjacent portion of the elements 3 and 5 respectively. An annular band 19 is secured to the upper end of the basket 5 and serves to effectively retain the hooks 15 in engagement with the ears 17 and 18. The minnows enter the large open end of the tubular body and pass through the conical portion and are trapped in the basket section 5. The device is adapted to be used in shallow water or deep water as either a seine or trap and the captured minnows may be readily removed from the combined seine and trap.

What I claim is:

A minnow seine comprising a reticulated body, bands secured to and reinforcing the front and rear ends of the body, longitudinally extending bars secured to said bands, a conical portion carried by the rear end of the body, a trap section carried by the conical portion, a handle passing through the central portion of and extending vertically from the reticulated body, a hand loop arranged in a plane extending vertically and longitudinally of the body and secured to and extending rearwardly from the upper end of the handle, and an inclined brace secured at its upper end to the under side of the hand loop and at its lower end to the rear band.

In testimony whereof I affix my signature in presence of two witnesses.

JESS L. COLLINS.

Witnesses:
W. H. HODGES,
A. C. ROGERS.

Copies of this patent may be obtained for five cents each, by addressing the "Commissioner of Patents, Washington, D. C."